May 27, 1947.  E. H. LEHMAN  2,421,075
FRICTION SHOCK ABSORBING MECHANISM
Filed Oct. 28, 1943
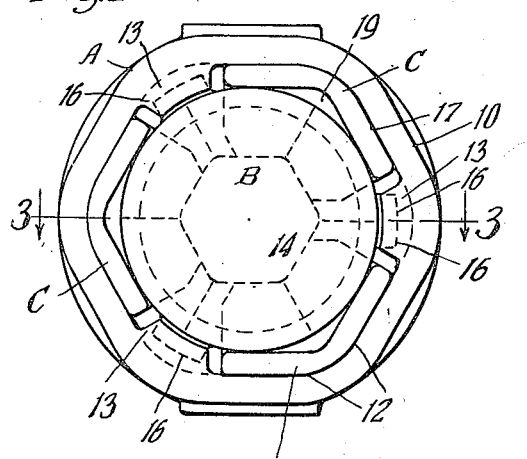
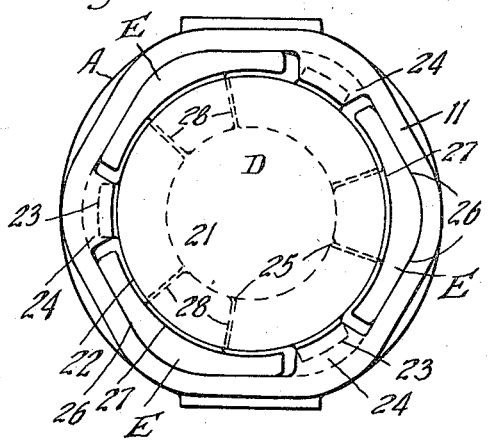
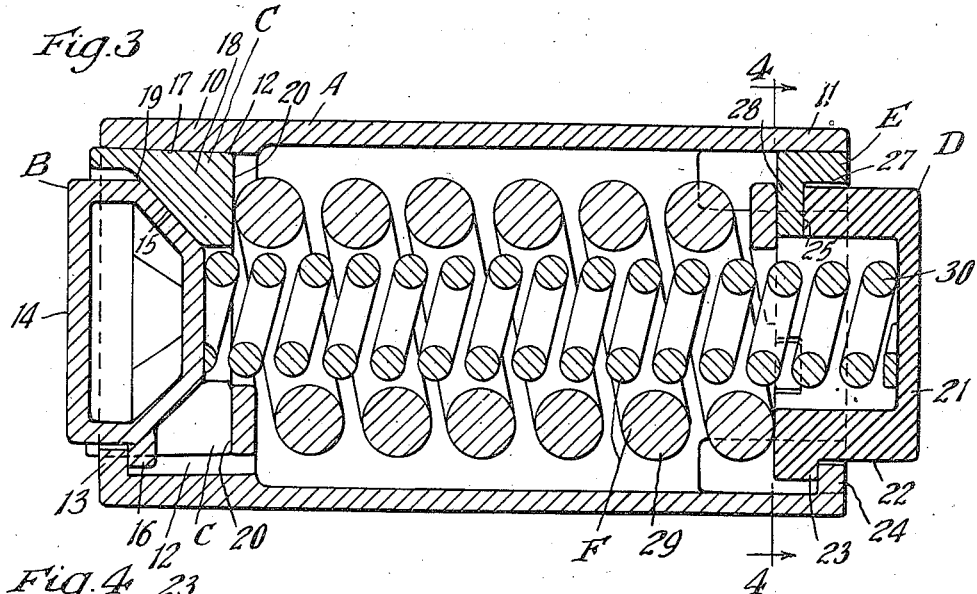
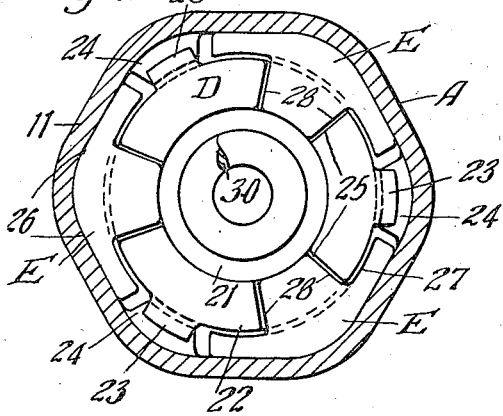
Inventor
Edward H. Lehman
By Henry Fuchs
Atty.

Patented May 27, 1947

2,421,075

UNITED STATES PATENT OFFICE 2,421,075

FRICTION SHOCK ABSORBING MECHANISM

Edward H. Lehman, Chicago, Ill., assignor to W. H. Miner, Inc., Chicago, Ill., a corporation of Delaware Application October 28, 1943, Serial No. 507,957

3 Claims. (Cl. 213—34)

This invention relates to improvements in friction shock absorbing mechanisms, especially adapted for railway draft riggings.

One object of the invention is to provide a friction shock absorbing mechanism including a friction casing, a spring resisted friction clutch slidingly telescoped within one end of the casing and a preliminary spring cap slidingly telescoped within the other end of the casing, wherein the cap and casing have interengaging lugs for limiting outward movement of the cap, and wherein the lugs of the cap and casing are held in cooperative aligned relation by locking members for holding said cap and casing against relative rotation.

A more specific object of the invention is to provide a mechanism as specified in the preceding paragraph, wherein the locking members for holding the cap and casing against relative rotation are in the form of blocks interposed between the cap and casing walls and having shouldered engagement with both the cap and casing.

A still further object of the invention is to provide in a mechanism, as hereinbefore set forth, a casing having a portion of angular transverse cross section and a preliminary spring cap slidingly telescoped within the friction casing of the mechanism and having circumferentially spaced radial lugs engageable with circumferentially spaced lugs on the casing for limiting outward movement of the cap, wherein the cap is held against rotation with respect to the casing, to maintain cooperative relation of the lugs of the cap and casing and prevent accidental separation of the parts, by blocks interposed between the casing walls and the cap interfitting with the angular contour of the casing and having projecting lugs engaging in seats of the cap.

A further object of the invention is to provide a friction shock absorbing mechanism comprising a casing having a friction shell section at one end and a spring cage section at the other end; a friction clutch slidably telescoped within the friction shell section of the casing comprising friction shoes slidably engaging the interior walls of the casing and a wedge pressure transmitting member having wedging engagement with the shoes, the wedge member having shouldered engagement with the casing to limit outward movement of the former; spring coils within the casing; a preliminary spring follower cap slidingly telescoped within the spring cage end of the casing and having radially projecting stop lugs adapted to seat against internal stop lugs at the spring cage end of the casing to limit outward movement of the cap, wherein the spring cap is provided with peripheral notches and the end of the casing, which telescopically receives the cap, is of hexagonal interior cross section, and an annular series of locking blocks interfitting with the notches of the cap and the hexagonal interior of the casing are interposed between the cap and the casing walls, thereby locking the cap and casing against relative rotation to prevent disalignment of the cooperating lugs thereof.

Other objects of the invention will more clearly appear from the description and claims hereinafter following.

In the drawing forming a part of this specification, Figure 1 is a front end elevational view of a friction shock absorbing mechanism embodying my invention. Figure 2 is a rear end elevational view of the same. Figure 3 is a horizontal sectional view, corresponding substantially to the line 3—3 of Figure 1. Figure 4 is a transverse vertical sectional view, corresponding to the line 4—4 of Figure 3.

As illustrated in the drawing, my improved shock absorbing mechanism comprises broadly a combined friction shell and spring cage casing A; a wedge pressure transmitting block B; three friction shoes C—C—C; a preliminary spring follower cap D; locking blocks E—E—E; and a spring resistance F.

The combined friction shell and casing A has the friction shell section 10 at the front end thereof and the spring cage section 11 rearwardly of said friction shell. The casing is open at opposite ends and has the friction clutch slidably telescoped within the open front end of the friction shell section thereof. The friction shell section of the casing is preferably of hexagonal interior and exterior cross section and has the walls thereof thickened, as shown in Figure 3. The rear end section of the casing is also of hexagonal interior and exterior cross section, said hexagonal portion being indicated by 11. Between said front and rear sections 10 and 11 the casing is preferably of cylindrical shape. The friction shell section of the casing is provided with six interior, substantially flat, inwardly converging friction surfaces 12 which are spaced symmetrically about the central longitudinal axis of the mechanism. The friction surfaces 12 are arranged in pairs, the adjacent surfaces of each pair together forming a friction face of V-shaped transverse contour. At the open front end the casing A is provided with three internal stop lugs 13 which are alternated with the three pairs of friction surfaces 12, the same being located between adjacent of said V-shaped friction faces which are formed by the pairs of surfaces 12.

The wedge B is in the form of a block having a transverse flat outer end face 14 adapted to be engaged by the usual front follower of the draft rigging. At the inner end portion thereof the block B is provided with three wedge faces 15—15—15, of V-shaped transverse cross section, arranged symmetrically about the longitudinal central axis of the wedge. The three faces 15 converge inwardly or rearwardly of the mechanism. At the outer ends of the wedge faces 15 the block B has three laterally, outwardly projecting, radial lugs 16—16—16, which are alternated with the wedge faces, as clearly shown in Figure 1. In other words, the lugs 16 are so arranged that they are located between adjacent wedge faces and extend between adjacent shoes C to engage in back of the lugs 13 of the casing and restrict outward movement of the wedge.

The three friction shoes C—C—C are of similar design, each shoe having an outer, longitudinally extending V-shaped friction face formed by two adjacent angularly arranged friction surfaces 17—17 which are adapted to cooperate with one of said pairs of friction surfaces 12—12, and are correspondingly inclined to said surfaces 12—12. On the inner side, each shoe C is provided with an enlargement 18, having a transversely extending V-shaped wedge face 19 thereon engaging with one of the V-shaped faces 15 of the block B and correspondingly inclined thereto. The inner ends of the enlargements 18 of the shoes present flat transverse abutment faces 20 on which the spring resistance F is adapted to bear.

The spring cap D is in the form of a heavy cup-shaped casting having a flat transverse end wall 21 and a cylindrical side wall 22. At the inner end, the cap is provided with three heavy radial lugs 23 adapted to engage in back of inturned lugs 24 provided at the open rear end of the casing A. As shown most clearly in Figures 2 and 3, the lugs 24 are three in number and are circumferentially spaced, being located at alternate corners of the hexagonal end section 11 of the casing. The outside diameter of the cap D is such that it completely clears the lugs 24 of the casing. At the inner end of the cap the side walls are cut out, or notched, providing seats 25, which are three in number and are alternated with the lugs 23, as most clearly shown in Figures 2 and 3.

The locking blocks E, which are three in number, are interposed between the cap D and the walls of the hexagonal section 11 of the casing A. As shown, the blocks E are alternated with the lugs 24 of the casing and each block occupies substantially the entire space between two adjacent lugs 24—24. At the outer side thereof, each block E fits the hexagonal contour of the section 11 of the casing, being provided with two flat faces 26—26, at an angle to each other, engaging with two adjacent inner walls of the hexagonal section 11. On the inner side, each block E has a curved face 27 conforming to the cylindrical contour of the cap D. At the inner end, each block E is provided with an inwardly projecting lug 28, which is radial to the central longitudinal axis of the mechanism and is normally seated in the corresponding notch or seat 25 of the spring cap D. As will be evident, with the parts assembled as shown in the drawing, the blocks E are held against rotation with respect to the casing A by being interengaged with the walls of the latter, and are locked to the cap by the lugs 28 thereof being seated in the notches 25 of the cap, thus locking the cap against rotation with respect to the casing and maintaining the lugs 23 and 24 of the cap and casing in aligned condition.

The spring resistance F comprises a heavy outer coil 29 and a relatively lighter inner coil 30. The inner coil has the front end bearing on the inner end of the wedge B and has the rear end thereof extending into the cap D and bearing on the inner side of the end wall 21 thereof. The outer coil 29 has its front end bearing on the inner ends of the shoes C—C—C and has its rear end bearing on the spring cap D and the lugs 28 of the blocks E—E—E. The springs 29 and 30 are preferably under initial compression and thus hold the lugs of the spring cap D and wedge B engaged with the corresponding lugs of the casing A, the outer spring 29, in addition, holding the lugs 28 of the blocks E seated in the notches of the cap D.

In assembling the mechanism, the wedge, shoes and springs are first placed within the casing. These parts may be inserted either through the front or rear end of the casing. When inserted through the front end the shoes are first applied and moved inwardly of the casing to permit insertion of the wedge to an extent to place the lugs 16 thereof rearwardly of the lugs 13 of the casing. After the wedge has been inserted it is rotated about its axis to align the lugs 16 with the lugs 13 so that they will engage and limit outward movement of the wedge when the latter is forced outwardly with respect to the casing. In assembling these parts through the rear end of the casing, the wedge, shoes and springs are entered in succession, the lugs 16 of the wedge being aligned with the lugs 13 of the casing. After the wedge B, shoes C—C—C, and springs 29 and 30 have been applied, the spring cap D and blocks E—E—E are placed within the rear end of the casing. In assembling the last named parts with the casing, the latter is preferably stood on end, the front end of the same being directly supported on blocks with the wedge free so that it will not be forced inwardly of the casing during the assembling operation. The blocks E—E—E are first placed in position upon the outer spring 29 and forced inwardly of the casing to a predetermined extent, so that the same is spaced inwardly from the lugs 24 at the rear end of the casing A a distance which is slightly in excess of the thickness of the lugs 23 of the cap D. While the blocks E are held in this predetermined postiion, the cap D is placed over the end of the spring 30 with the lugs 23 displaced circumferentially to one side of the lugs 24 of the casing. The cap is then forced inwardly against the resistance of the spring 30 until the lugs 23 of the cap reach a position rearwardly of the lugs 24. The cap is then turned until the lugs thereof register with the lugs of the casing. The pressure is then removed from the blocks E—E—E, permitting the spring 29 to project the same outwardly and engage the lugs 28 thereof within the seats 25 of the cap, thus locking the cap against rotation.

The operation of my improved shock absorbing mechanism is as follows: As the mechanism is compressed between the followers of the draft rigging, the spring follower cap D is first forced inwardly against the resistance of the springs 29 and 30, producing light preliminary action of the mechanism, the friction between the shoes and the casing being sufficiently great during this action to practically hold the friction clutch against movement inwardly of the casing. Upon the rear follower of the draft rigging coming into engagement with the rear end of the casing, further compression of the mechanism forces the wedge inwardly of the casing, spreading the shoes apart and sliding the same inwardly of the casing against the resistance of the spring 29, thereby providing high shock absorbing capacity.

In release, the springs 29 and 30 force the wedge B, shoes C—C—C, and spring cap D outwardly, thereby restoring the parts to their normal position, outward movement of the wedge being limited by engagement of the lugs 16 thereof with the lugs 13 of the casing and outward movement of the spring cap D being limited by engagement of the lugs 23 thereof with the lugs 24 of the casing.

I have herein shown and described what I now consider the preferred manner of carrying out my invention, but the same is merely illustrative and I contemplate all changes and modifications that come within the scope of the claims appended hereto.

I claim:

1. In a friction shock absorbing mechanism, the combination with a casing open at the front and rear ends; of a friction clutch telescoped within the front end of the casing and having sliding frictional engagement with the casing; stop shoulders at the rear end of said casing; a cup-shaped, cylindrical cap slidingly telescoped within the other end of the casing; radially outwardly projecting lugs on said cap engaging the shoulders of said casing to limit outward movement of the cap; locking blocks surrounding said cap interposed between the cap and interior walls of the casing, said cap being provided with radially disposed seats, and said blocks having inwardly projecting lugs overhanging said cap and engaging in the seats of the latter for locking the cap against rotation with respect to said blocks, said blocks and casing walls having interengaging angular faces for locking said blocks against rotation with respect to the casing; and spring means within the casing opposing relative movement of the cap and clutch inwardly of the casing, said spring means bearing on the blocks to hold the lugs thereof engaged in said seats.

2. In a friction shock absorbing mechanism, the combination with a casing open at the front and rear ends; of a friction clutch telescoped within the front end of the casing and having sliding frictional engagement therewith; a cylindrical spring cap slidable within the rear end of the casing; cooperating lugs on said cap and the rear end of the casing for limiting outward movement of the cap; locking blocks surrounding said cap, said blocks being interposed between said cap and the casing, the inner ends of said blocks being flush with the inner end of said cap, said blocks and casing having interengaging V-shaped guide surfaces for guiding said blocks lengthwise of the casing while holding the same against lateral displacement; interengaging lugs and notches on said blocks and cap for holding the latter against rotation; and spring means within the casing opposing relative approach of said clutch and cap, said spring means bearing on said blocks to hold the lugs thereof seated in said notches.

3. In a friction shock absorbing mechanism, the combination with a casing open at the front and rear ends, said casing being of hexagonal interior cross section at said rear end; of a friction clutch slidingly telescoped within the front end of the casing and having sliding frictional engagement therewith; a cylindrical hollow cap slidable within the rear end of the casing, said cap having peripheral notches at the inner end thereof; interengaging stop lugs on the casing and cap limiting outward movement of the cap; locking blocks surrounding said cap and having inwardly projecting radial lugs overhanging the cap and seated in the notches of the same, each block having a V-shaped outer face interengaged with two adjacent faces of the hexagonal rear end of the casing; and spring means within the casing interposed between the cap and clutch opposing relative approach of the clutch and cap, said spring means bearing on said blocks to hold the lugs thereof seated in said notches.

EDWARD H. LEHMAN.

REFERENCES CITED

The following references are of record in the file of this patent:

UNITED STATES PATENTS

| Number | Name | Date |
| --- | --- | --- |
| 2,329,338 | Dath | Sept. 14, 1943 |
| 2,335,847 | Dath | Dec. 7, 1943 |
| 2,050,541 | Olander | Aug. 11, 1936 |
| 1,372,705 | Lewis | Mar. 29, 1921 |
| 1,251,089 | O'Connor | Dec. 25, 1917 |
| 2,076,769 | Dentler | Apr. 13, 1937 |
| 2,326,288 | Dath | Aug. 10, 1943 |